United States Patent [19]

Otsuka

[11] 4,358,964
[45] Nov. 16, 1982

[54] ELECTROMAGNETIC FLOWMETER

[75] Inventor: Koichi Otsuka, Yokohama, Japan

[73] Assignee: Otsuka Kogyo Co., Ltd., Kanagawa, Japan

[21] Appl. No.: 162,998

[22] Filed: Jun. 25, 1980

[30] Foreign Application Priority Data

Jun. 30, 1979 [JP] Japan .................................. 54-82815

[51] Int. Cl.$^3$ .............................................. G01F 1/58
[52] U.S. Cl. ................................ 73/861.13; 73/861.12
[58] Field of Search ..................... 73/861.11–861.17, 73/861.01, 861.02, 861.08, 861.09, 861.10, ; 128/691, 692

[56] References Cited

U.S. PATENT DOCUMENTS

| | | | |
|---|---|---|---|
| 2,149,847 | 3/1939 | Kolin | 73/861.13 |
| 2,741,121 | 4/1956 | Raynsford | 73/861.12 |
| 2,800,016 | 7/1957 | Sturgeon | 73/861.12 |
| 3,148,541 | 9/1964 | Higgins | 73/861.08 |
| 3,171,990 | 3/1965 | Bennett | 73/861.11 |
| 3,180,144 | 4/1965 | Bennett | 73/861.12 |
| 3,194,068 | 7/1965 | Mannherz et al. | 73/861.16 |
| 3,334,518 | 8/1967 | Miyamichi | 73/861.12 |
| 3,504,541 | 4/1970 | Birnstingl | 73/861.12 |
| 3,620,079 | 11/1971 | Nosley | 73/861.15 |
| 4,195,515 | 4/1980 | Smoll | 73/861.13 |
| 4,286,470 | 9/1981 | Lynnworth | 73/637 |

FOREIGN PATENT DOCUMENTS

| | | | |
|---|---|---|---|
| 55-107920 | 8/1980 | Japan | 73/861.12 |
| 200111 | 7/1967 | U.S.S.R. | 128/691 |

Primary Examiner—Edward R. Kazenske
Assistant Examiner—David V. Carlson
Attorney, Agent, or Firm—Blanchard, Flynn, Thiel, Boutell & Tanis

[57] ABSTRACT

An electromagnetic flowmeter for measuring the flow rate of electrically-conductive fluids through a conduit. A magnetic field generating device has a U-shaped iron core with a gap between the ends thereof and a coil on the core energizable to produce a magnetic field across the gap. A boxlike body of molded resin has a bottom wall and side walls with the iron core and coil enclosed in the central portion thereof. The body extends along the axis of the conduit and receives the conduit removably but snugly between the side walls thereof. The bottom wall of the body is spaced below the conduit by an electrode receiving space and a substantially diametrically opposed pair of electrodes enter the conduit within the gap along a line substantially at right angles to the magnet field across the gap. The boxlike body has end walls with upward facing depressions supporting portions of the conduit axially spaced in opposite directions from the electrodes. Clamping members clamp the conduit in the end wall depressions. The side walls of the body extend in height beyond the conduit sufficiently to flank both the electrodes therebetween. The tops of the end walls lie below the tops of the side walls.

5 Claims, 7 Drawing Figures

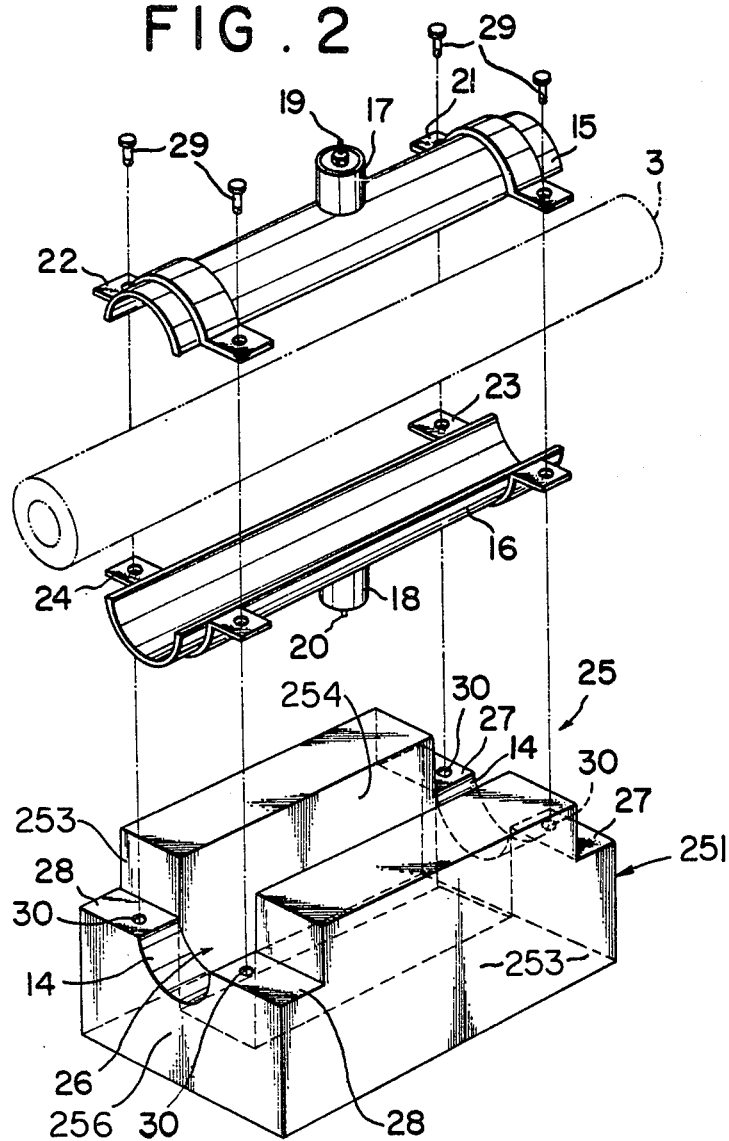

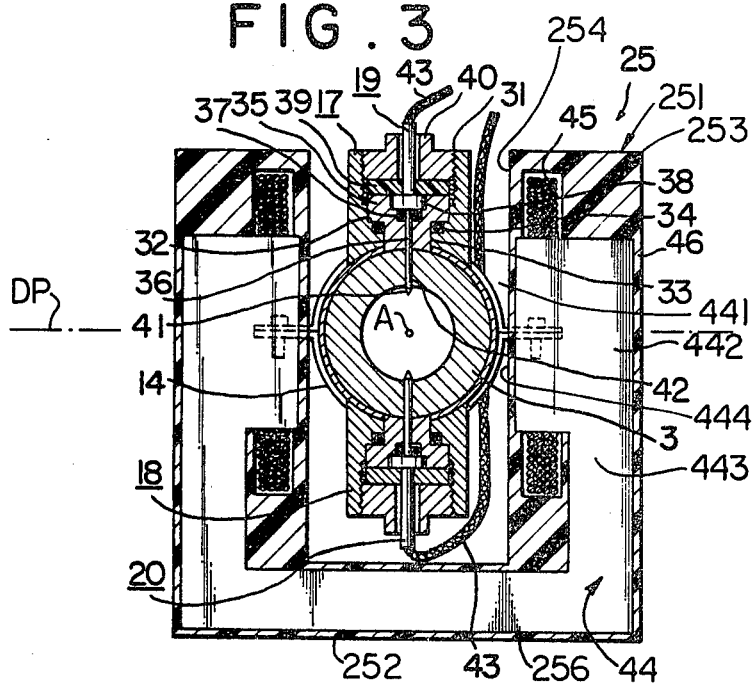
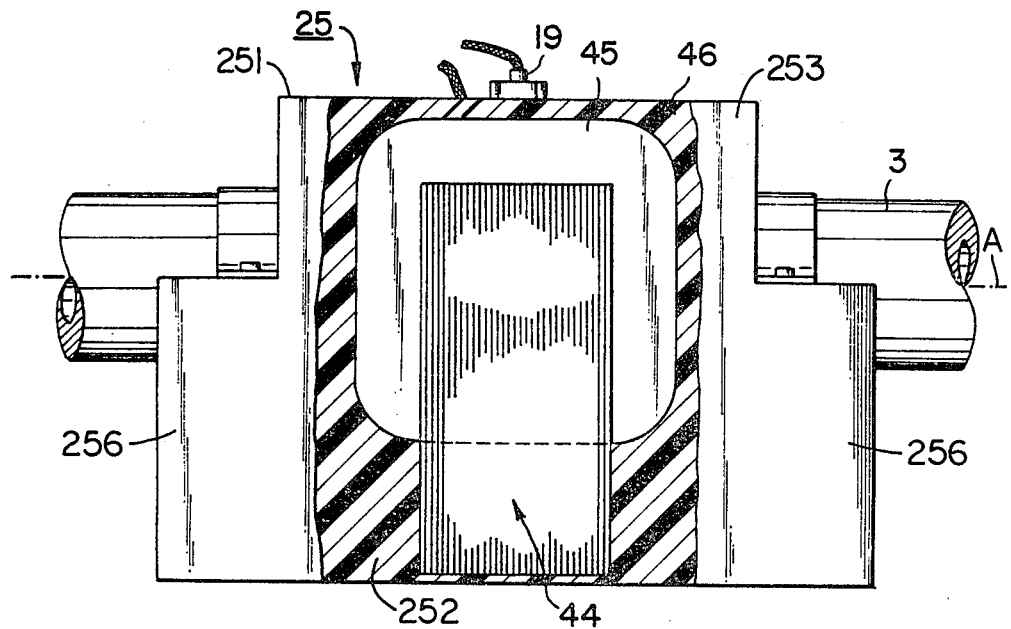

ELECTROMAGNETIC FLOWMETER

BACKGROUND OF THE INVENTION

The present invention relates to an electromagnetic flowmeter for measuring the flow rate of grout and concrete used in the construction and building areas.

It is very important to measure the flow rate of grout accurately when it is forced by pressure into soil for soil stabilization. Undergrouting cannot achieve ground improvement, and overgrouting not only results in waste of grout but also brings about accidents such as deformation of ground, spouting of grout through soft beds and underground openings, and lifting and leaning of existing structures such as dams and buildings. The quantity of grout to be forced should be changed according to the type of soil. For accurate measurement of grout fow rate, the electromagnetic flowmeter recently has come into general use because of its feature that it has no complex mechanical parts in the conduit that carries the fluid to be measured. Unlike conventional differential pressure type and vane-wheel type flowmeters, the electromagnetic flowmeter has no orifice nor revolving body which projects into the conduit and causes pressure loss or gelation of grout.

In spite of this advantage, the commercial electromagnetic flowmeter as shown in FIG. 1 suffers from a disadvantage when used for grouting. In FIG. 1, grout is adjusted to a proper concentration by the mixer (1a), stored in the tank (1b), and then forced by pressure into soil by the pump (2) through the rubber hose (3), the electromagnetic flowmeter (4), and the pipe (6) fitted to the boring machine (5). The electromagnetic flowmeter is made up of the rubber-lined stainless steel pipe (7), the flanges (8) attached to both ends of the pipe for connection of the rubber hoses (3), the coil (9) and iron core (10) placed outside the pipe (7), and the electrode (11) attached to the pipe (7). The coils, iron cores, and electrodes are encased in the casing (12), (13). The grout which is forced by pressure through this electromagnetic flowmeter tends to settle and adhere to the pipe (7) and electrode (11) due to its inherently high consistency and ease of solidification. The deposited grout has to be removed frequently by water washing; otherwise, it will gel to form a film which results in errors in measurements. When grout settles on the inner wall of the pipe (7), the electromagnetic flowmeter (4) has to be discarded entirely because it is impossible in practice to exchange the pipe (7) alone. Moreover, it is difficult for the conventional electromagnetic flowmeter to measure the flow rate of fluids at pressures higher than 150 $kg/cm^2$, because the connection by flange (8) of the electromagnetic flowmeter (4) and the rubber hose (3) is not strong enough and the sealing between the electrode (11) and the pipe (7) is not complete.

BRIEF SUMMARY OF THE INVENTION

In order to solve the above-mentioned problems, an attempt has been made to measure the flow rate of grout being carried in the conduit. According to this invention, the conduit is held in a magnetic field generating device formed with a U-shaped iron core and coils wound thereon, and a pair of electrodes are inserted opposite each other directly into the conduit so that the direction of the electrodes, the direction of the magnetic field, and the direction of fluid flow are perpendicular to one another. The electrodes may be attached to the pipe by simply screwing or by fitting an electrode holder to a previously drilled hole. The above-mentioned structure obviates the need for removing gelled grout from the electrodes. The electrodes may be dislocated easily or a part of the conduit to which are attached the electrodes may be renewed. In addition, the electrodes may be cleaned easily when removed from the conduit. In conventional electromagnetic flowmeters, the electrodes and the magnetic field generating device are integrally attached to the pipe and it is troublesome to eliminate grout which has gelled on the electrodes.

In contrast with conventional electromagnetic flowmeters, the one according to this invention is characterized by that flow measurement can be accomplished by simply fitting the magnetic field generating device to the conduit and attaching the electrodes to the conduit, and that it is not necessary to cut off the conduit to connect the flowmeter with flanges. The flowmeter of this invention does not cause clogging of grout and permits flow measurements for any existing conduit. The absence of flanges makes it possible to measure the flow rate of high pressure fluids above 500 $kg/cm^2$, which is much higher than the upper limit of 150 $kg/cm^2$ for conventional flowmeters.

As will be apparent from the foregoing description, it is an object of this invention to provide an electromagnetic flowmeter which permits measurement of flow rate across the conduit such as a rubber hose through which grout is forced by pressure.

It is another object of this invention to provide an electromagnetic flowmeter which is constructed such that the function can be recovered easily even when gelation of grout occurs in the conduit.

It is further another object of this invention to provide an electromagnetic flowmeter which permits measurements of flow rate at high pressures.

Other and further objects, features and advantages of the invention will appear more fully from the following description.

BRIEF DESCRIPTION OF THE INVENTION

FIG. 2 is an exploded perspective view of one form of the electromagnetic flowmeter embodying the invention.

FIG. 3 is a sectional side elevation of the electrodes and magnetic field generating device of the electromagnetic flowmeter embodying the invention.

FIG. 4 is a sectional and partly cutaway view of the electrodes and magnetic field generating device shown in FIG. 3.

DETAILED DESCRIPTION OF THE INVENTION

Figure 1:
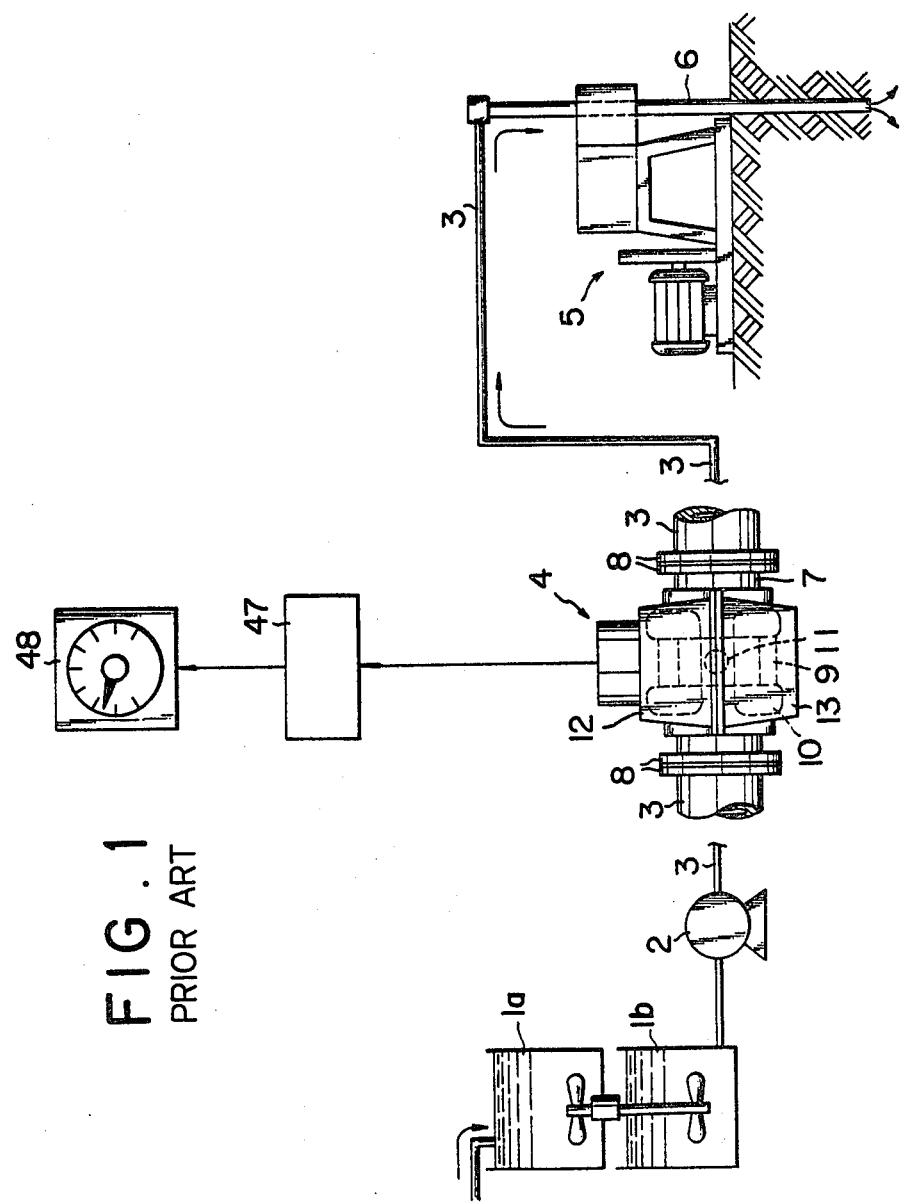
FIG. 1 is a schematic presentation of a grouting equipment which employs a conventional electromagnetic flowmeter.

Referring first to the embodiment of the invention shown in FIGS. 2–5, there is shown a conduit (3) like a rubber hose through which, as in FIG. 1, an electrically-conductive fluid like grout is forced by pressure from a pump (2) to an injecting pipe (6). Semicylindrical protective covers (15), (16), as seen in FIG. 2, are made of a nonmagnetic material and are placed on the conduit (3). The protective covers (15), (16) are provided at the center with cylindrical electrode holders (17), (18) made of a nonmagnetic material. These electrode holders (17), (18) hold the electrodes (19), (20) mentioned later. The protective covers (15), (16) are also provided at near their ends with tongues (21), (22), (23), (24) to join them together.

A magnetic field generating device (25) generates a magnetic field in the direction perpendicular to both the conduit (3) and the electrodes (19), (20). The magnetic field generating device (25) is made up of a U-shaped iron core (44) FIG. 3 with a gap (441) between the free ends (442) of the legs (443) thereof to receive the conduit (3) and a coil (45) thereon energizable to produce a magnetic field across the gap between the free ends of the legs of the U-shaped iron core, as mentioned later. All the components are molded in a boxlike body (251) (FIGS. 2 and 3) of a resin (46) or the like. The boxlike body (251) of the magnetic field generating device (25) has a bottom wall (252) and side walls (253) which side walls define therebetween at its center a recess (26) to hold the conduit (3) with the protective covers placed thereon. The iron core and coil are enclosed in the central portion of said body, said body extending along the axis A of said conduit to receive the conduit removably but snugly between the side walls (253) thereof. The inner faces (444) (FIG. 3) of the free ends of said legs of said iron core lie nearly flush with the inner faces (254) of said side walls. The bottom wall of said body is spaced below said conduit by a portion of the recess (26) defining an electrode receiving space closed at its ends by end walls (256) of said body. The recess (26) is provided at its ends with steps (27), (28) to hold the tongues (21), (22), (23), (24), and which have tapped holes (30), for screws (29). The steps (27), (28) form the tops of the end walls (256). The steps (27), (28) each have an upward facing semicircular recess, or depression (14) to hold the conduit (3). The steps (27), (28) are substantially coplanar with a diametral plane (DP) (FIG. 3) of the conduit.

Figure 5:
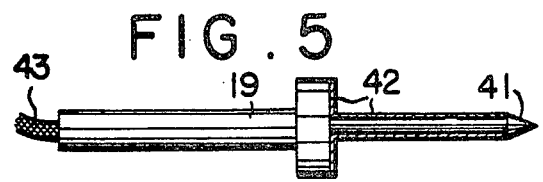
FIG. 5 is a front view partially in cross section of the electrode.

FIGS. 3 and 4 show the details of the electrode holders (17), (18) and the magnetic field generating device (25). The electrode holders (17), (18), which are of the same structure, have a thread (31) inside and a through hole (33) with a stepped part (32) of smaller diameter. An insulating bushing (35) made of teflon or the like is fitted to the stepped part (32) with an O-ring (34) placed therebetween. An electrode (19) is inserted into the central hole (36) of the bushing (35) with an O-ring (37) placed therebetween. An insulator plate (39) of teflon or the like is engaged with the projection (38) of the electrode (19). The electrode (19) is forced into the conduit (3) by a nut (40) which is placed on the plate (39) and is engaged with the thread (31) of the electrode holder (17). As shown in FIG. 5, the tip (41) of the electrode (19) is sharpened, the surface of the electrode that comes in contact with the conduit is coated with an insulation film (42) such as teflon, and the stem is connected to a lead wire (43). The magnetic field generating device (25) is made up of a laminated U-shape iron core (44) and coils (45), which are integrally molded with resin (46).

The procedure for mounting the flowmeter of this invention on the conduit (3) is described below. The magnetic field generating device (25) is installed on a flat place where the conduit (3) is laid, and then a part of the conduit (3) is fitted into the recess (26) of the magnetic field generating device (25) after insertion of electrodes into the conduit (3), as follows. More particularly, holes a little smaller in diameter than that of the tip (41) of the electrodes (19),(20) are drilled opposite each other on the conduit (3). The protective covers (15),(16) are placed on the conduit (3), the O-ring (34) is placed on the stepped part (32) of the electrode holder (17), the bushing (35) is inserted, the other O-ring (37) is placed, the electrode (19) is inserted, the plate (39) is placed, and the nut (40) is screwed into the electrode holder (17) until the tip of the electrode (19) projects into the conduit. The electrode (20) is attached in the same manner as above. The conduit (3) with the protective covers (15),(16) and the electrodes (19),(20) attached thereto, is fitted into the recess (26) so that the tongues (21),(22),(23),(24) are engaged with the stepped parts (27),(28) and fixed to them with screws (29).

The electromagnetic flowmeter of this invention installed as mentioned above functions according to the known principle. When an exciting current is applied to the coil (45) of the magnetic field generating device (25), a magnetic field is generated by the iron core (44). It is assumed that the inside diameter of the conduit (3) is D cm and there is a uniform magnetic field of magnetic flux density B Gauss in the conduit. When grout is forced through the conduit (3) at a flow rate of V cm/s, the magnetic field generates an electromotive force $$E = D \cdot V \cdot B \times 10^{-8} \text{ (Volt)} \tag{1}$$

in the direction perpendicular to both the magnetic field and the flow.

Since volumetric flow rate Q is represented by $$Q = (\pi/4) \cdot D^2 \cdot V \text{ (cm}^3/\text{s)} \tag{2}$$

from equations (1) and (2), $$Q = (\pi/4) \cdot (D/B) \cdot E \times 10^8 \text{ (cm}^3/\text{s)} \tag{3}$$

Thus, the electromotive force is represented by $$E = (4/\pi) \cdot (B/D) \times 10^{-8} \text{ (Volt)}$$

Equation (3) indicates that the volumetric flow rate Q is proportional to the electromotive force E if the magnetic flux density B is constant. Thus, the electromotive force E detected by the electrodes (19),(20) is converted by a converter (47), seen in FIG. 1, into a flow rate which is displayed and recorded on a recording-indicator (48).

Figure 6:
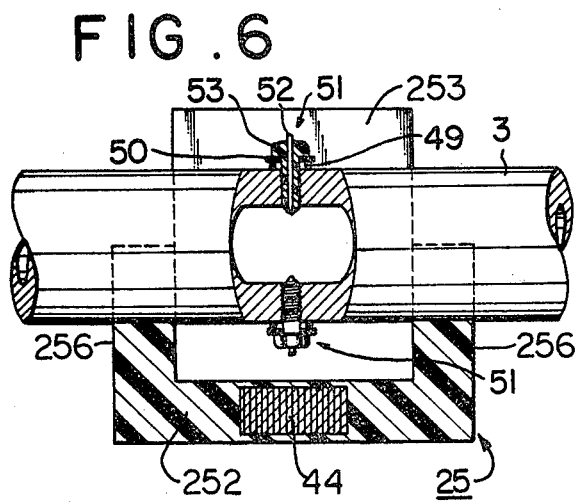
FIG. 6 is a front view partially in cross section of another embodiment of the invention.

In the above-mentioned embodiment of FIGS. 2-5, the electrodes (19),(20) are held by the electrode holders (17),(18) integrally attached to the protective covers (15),(16). In another embodiment, however, the electrode (51) may be screwed directly into the wall of the conduit (3), with an O-ring (49) and washer (50) inserted, as shown in FIG. 6. In this case, the central conductive part (52) may be insulated from the conduit by the nonconductive threaded part (53). This arrangement makes the apparatus simple.

Figure 7:
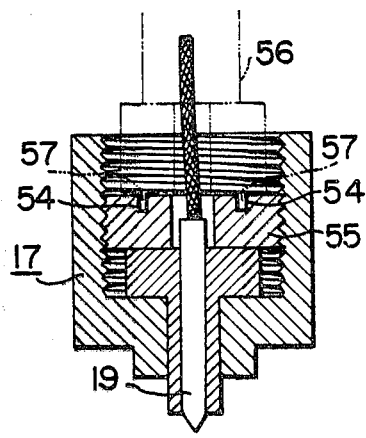
FIG. 7 is a cross-sectional view of the electrode holder in another embodiment.

In the embodiment as shown in FIG. 3, the electrodes (19),(20) are inserted by tightening the nut (40) using a wrench. In the embodiment as shown in FIG. 7, the electrode is inserted by tightening the nut (55) having engaging holes (54) thereon using a forked screwdriver (56) with its projections (57) engaged with the holes (54).

In the above-mentioned embodiments, a rubber hose is illustrated as the conduit (3) for grout, but hoses made of plastics may be employed as well. The conduit should not be reinforced with a magnetic material such as metal wires.

The conduit (3) may be made of aluminum, brass, copper, and stainless steel as well as rubber and plastics. In the case of conduit of these materials, the electrode should be attached to a tapped hole made on the conduit wall and insulated with teflon and the like from the conduit wall.

In the above-mentioned embodiment, teflon is used as an insulator (42) for the electrodes (19),(20); but it may be replaced by Delrin, Bakelite, and other insulating materials. If the conduit (3) is made of an insulating material, it is not necessary to insulate the electrodes (19),(20).

In the above-mentioned embodiment, the magnetic field generating device (25) has the U-shaped recess (26), with its opening upward. The device may be placed horizontally or inversed.

In the above-mentioned embodiment, only one pair of electrodes (19), (20) is attached to the conduit (3); but two or more pairs of electrodes may be attached at close positions or at regular intervals. Such an arrangement will facilitate taking necessary measures in case of trouble due to, e.g., gelation of liquid or clogging by solids. One pair of electrodes may be switched to the other, or one pair of electrodes may be selected after comparing the outputs of two pairs of electrodes.

The electromagnetic flowmeter according to this invention is particularly effective for grouting in the construction area. It also will be suitable for any conductive fluids such as mortar, cement, drinking water, sewage, industrial water, acid liquids, lime slurry, and pulp slurry.

What is claimed is:

1. An electromagnetic flowmeter for attachment to a conduit intermediate the ends of the conduit, comprising:

a magnetic field generating device comprising a U-shaped iron core having legs with free ends and means spacing said free ends by a conduit receiving gap and a coil means thereon energizable for producing a magnetic field across the gap between the free ends of the legs of the U-shaped iron core; and
    a substantially diametrally opposed pair of electrodes disposed in said gap and having means for entering a conduit along a line substantially at right angles to the magnetic field across said gap;
    output means connected to said electrodes for providing a flowmeter output; and
    wherein the improvement comprises:
        a boxlike body of molded resin or the like having a bottom wall, end walls and side walls with said iron core and coil means encapsulated in said resin in the bottom wall and side walls at the central portion of said body, said side walls having inner faces spaced by a conduit receiving space wide enough to receive a conduit removably but snugly between the side walls thereof, said conduit receiving space having an axis along which said body extends, the free ends of said legs of said iron core having free ends lying nearly flush with the inner faces of said side walls, the bottom wall of said body being spaced below said conduit receiving space by an electrode receiving space closed at its ends by said end walls of said body, the ends walls having means defining upward facing depressions aligned along said axis for receiving and supporting portions of a conduit axially spaced on each side of said electrodes;
        means cooperative with said end walls for fixedly clamping a conduit in said body, the top of said boxlike body being open from said conduit receiving space, said boxlike body being orientable about said conduit receiving space axis so that the top of said boxlike body opens up, down or sidewardly as desired, said side walls of said body extending in height beyond said conduit receiving space sufficiently to flank both of said electrodes therebetween, the tops of said end walls lying below the tops of said side walls and being substantially coplanar with a diametral plane of said conduit receiving space, said clamping means comprising a clamping member placed across said conduit receiving space and fixed across atop each said end wall for clamping a conduit in said depressions, said bottom wall being spaced below the bottoms of said depressions in said end walls.

2. An electromagnetic flowmeter attached to a conduit intermediate the ends of the conduit to monitor the flow of electrically conductive fluid therein comprising:
    a conduit;
    a magnetic field generating device comprising a U-shaped iron core having legs with free ends and means spacing said free ends by a gap receiving said conduit and a coil means on said core and energizable for producing a magnetic field across the gap between the free ends of the legs of the U-shaped iron core; and
    a substantially diametrally opposed pair of electrodes entering said conduit within said gap along a line substantially at right angles to the magnetic field across said gap;
    output means connected to said electrodes for providing a flowmeter output; and
    wherein the improvement comprises:
        a boxlike body of molded resin or the like having a bottom wall, end walls and side walls with said iron core and coil means encapsulated in said resin in the central portion of said body, said body extending along the axis of said conduit and receiving the conduit removably but snugly between the side walls thereof, the inner faces of the free ends of said legs of said iron core lying nearly flush with the inner faces of said side walls, the bottom wall of said body being spaced below said conduit by an electrode receiving space closed at its ends by said end walls of said body, the end walls having upward facing depressions coaxially aligned and receiving and supporting portions of the conduit axially spaced on each side of said electrodes;
        means cooperative with said end walls for fixedly clamping said conduit in said body, the top of said boxlike body being open and receiving the conduit thereinto, said boxlike body being orientable about said conduit so that the top of said boxlike body opens up, down or sidewardly as desired, said side walls of said body extending in height beyond said conduit sufficiently to flank both of said electrodes therebetween, the tops of said end walls lying below the tops of said side walls and being substantially coplanar with a diametral plane of said conduit, said clamping means comprising a clamping member placed across said conduit and fixed across atop each said end wall for clamping said conduit in said depressions, said bottom wall being spaced below the bottoms of said depressions in said end walls.

3. The electromagnetic flowmeter as set forth in claim 2, including electrode holders for holding the electrodes and attached to opposed semicylindrical protective covers, the electrodes being inserted into the conduit opposite each other with the protective covers in place on opposite sides of the conduit, said clamping members including tongues on the covers fastened atop said end walls of the body.

4. The electromagnetic flowmeter as set forth in claim 2, wherein the electrodes have an insulating coating on the part which comes in contact with the conduit.

5. The electromagnetic flowmeter as set forth in claim 2, including electrode holders for holding the electrodes, in which each electrode holder has a stepped axial through bore including a threaded large diameter outer part and a small diameter inner part connected by an outwardly facing radial step, a hollow bushing having an inner shank snugly received in said inner part of said through bore and a large diameter outer head abutting said step and received loosely in said outer part of said through bore, said electrode extending snugly axially through said hollow bushing, an externally threaded annular member loosely receiving said electrode axially therethrough and threaded into said outer threaded part of said through bore and pressing said bushing firmly against said step in said electrode bolder.

* * * * *

UNITED STATES PATENT AND TRADEMARK OFFICE
CERTIFICATE OF CORRECTION

PATENT NO. : 4 358 964
DATED : November 16, 1982
INVENTOR(S) : Koichi Otsuka

It is certified that error appears in the above—identified patent and that said Letters Patent is hereby corrected as shown below:

Column 5, line 64;   delete "having free ends".

Column 8, line 18;   "bolder" should read ---holder---.

Signed and Sealed this

Twenty-sixth Day of April 1983

[SEAL]

Attest:

GERALD J. MOSSINGHOFF

Attesting Officer    Commissioner of Patents and Trademarks